United States Patent
Najork et al.

(10) Patent No.: US 6,321,265 B1
(45) Date of Patent: Nov. 20, 2001

(54) SYSTEM AND METHOD FOR ENFORCING POLITENESS WHILE SCHEDULING DOWNLOADS IN A WEB CRAWLER

(75) Inventors: Marc Alexander Najork, Palo Alto; Clark Allan Heydon, San Francisco, both of CA (US)

(73) Assignee: AltaVista Company, Palo Alto, CA (US)

( * ) Notice: Subject to any disclaimer, the term of this patent is extended or adjusted under 35 U.S.C. 154(b) by 0 days.

(21) Appl. No.: 09/433,005

(22) Filed: Nov. 2, 1999

(51) Int. Cl.[7] .................................................. G06F 13/00
(52) U.S. Cl. ............................................................ 709/224
(58) Field of Search ................................... 709/200, 201, 709/203, 217, 218, 219, 220, 223, 224, 245

(56) References Cited

U.S. PATENT DOCUMENTS

| | | | |
|---|---|---|---|
| 5,855,020 | 12/1998 | Kirsch | 707/10 |
| 5,907,837 | * 5/1999 | Ferrel et al. | 707/3 |
| 5,961,602 | * 10/1999 | Thompson et al. | 709/299 |
| 5,974,455 | 10/1999 | Monier | 709/223 |
| 6,032,196 | 2/2000 | Monier | 709/245 |
| 6,094,649 | * 7/2000 | Bowen | 707/3 |
| 6,101,491 | 8/2000 | Woods | 707/3 |
| 6,145,003 | 11/2000 | Sanu et al. | 709/225 |
| 6,154,738 | * 11/2000 | Call | 707/4 |
| 6,199,081 | * 3/2001 | Meyerzon et al. | 707/513 |

FOREIGN PATENT DOCUMENTS

PCT/US01/29497  3/2001  (WO) .

* cited by examiner

Primary Examiner—Moustafa M. Meky
(74) Attorney, Agent, or Firm—Pennie & Edmonds LLP

(57) ABSTRACT

A web crawler downloads data sets from among a plurality of host computers. The web crawler enqueues data set addresses in a set of queues, with all data set addresses sharing a respective common host address being stored in a respective common one of the queues. Each non-empty queue is assigned a next download time. Multiple threads substantially concurrently process the data set addresses in the queues. The number of queues is at least as great as the number of threads, and the threads are dynamically assigned to the queues. In particular, each thread selects a queue not being serviced by any of the other threads. The queue is selected in accordance with the next download times assigned to the queues. The data set corresponding to a data set address in the selected queue is downloaded and processed, and the data set address is dequeued from the selected queue. When the selected queue is not empty after the dequeuing step, it is assigned an updated download time. Then the thread deselects the selected queue, and the process of selecting a queue and processing a data set repeats. The next download time assigned to each queue is preferably a function of the length of time it took to download a previous document whose address was stored in the queue. For instance, the next download time may be set equal to the current time plus the a scaling constant multiplied by the download time of the previous document.

42 Claims, 9 Drawing Sheets

132

| TABLE | |
|---|---|
| HOST IDENTIFIERS (260) | QUEUE IDS (262) |
| A | 0 |
| B | 1 |
| C | 2 |
| ... | ... |
| H | n-1 |

FIG. 7

SYSTEM AND METHOD FOR ENFORCING POLITENESS WHILE SCHEDULING DOWNLOADS IN A WEB CRAWLER

The present invention relates to a system and method for accessing documents, called web pages, on the world wide web (WWW) and, more particularly, to a method for scheduling web crawlers to efficiently download web pages from the world wide web.

BACKGROUND OF THE INVENTION

Documents on interconnected computer networks are typically stored on numerous host computers that are connected over the networks. For example, so-called "web pages" are stored on the global computer network known as the Internet, which includes the world wide web. Each web page on the world wide web has a distinct address called its uniform resource locator (URL), which at least in part identifies the location of the web page. Most of the documents on the world wide web are written in standard document description languages (e.g., HTML, XML). These languages allow an author of a document to create hypertext links to other documents. Hypertext links allow a reader of a web page to quickly move to other web pages by clicking on their respective links. These links are typically highlighted in the original web page. A web page containing hypertext links to other web pages generally refers to those pages by their URL's. Links in a web page may refer to web pages that are stored in the same or different host computers.

A web crawler is a program that automatically finds and downloads documents from host computers in networks such as the world wide web. When a web crawler is given a set of starting URL's, the web crawler downloads the corresponding documents, then the web crawler extracts any URL's contained in those downloaded documents and downloads more documents using the newly discovered URL's. This process repeats indefinitely or until a predetermined stop condition occurs. As of 1999 there were approximately 500 million web pages on the world wide web, and the number is continuously growing; thus, web crawlers need efficient data structures to keep track of downloaded documents and any discovered addresses of documents to be downloaded. One common data structure to keep track of addresses of documents to be downloaded is a first-in-first-out (FIFO) queue. Using FIFO queues, URL's are enqueued as they are discovered, and dequeued in the order enqueued when the crawler needs a new URL to download.

A high-performance web crawler typically has the capability to download multiple documents in parallel, either by using asynchronous I/O or multiple threads. A thread is an abstraction for an execution entity within a running computer program. When a running computer program is composed of more than one thread, the program is said to be "multi-threaded." The threads of a multi-threaded program run in parallel and share the same memory space, but each thread in a multi-threaded program executes independently of the others. Each thread in a multi-threaded program has its own program counter and stack.

Discovered URL's from any particular web page often tend to refer to documents located on the same host computer. Therefore, if a FIFO queue is used by a web crawler to store those discovered URL's, sequentially dequeued URL's could cause multiple parallel requests to the same host computer. Sending multiple parallel requests to the same host computer may overload the host, diminishing its responsiveness to page requests, or may even cause the host to crash, either of which may create a bottleneck in the web crawl and reduce the crawler's effective parallel processing.

Examples of known prior art methods aimed at preventing the issuance of multiple parallel requests to one host computer include the Internet Archive web crawler and the Scooter web crawler used by AltaVista.

The Internet Archive crawler keeps a separate FIFO queue per web host. During a crawling process, 64 FIFO queues are selected and assigned to the process. The 64 queues are processed in parallel with the crawler dequeuing one URL at a time from each queue and downloading the corresponding document. This process ensures that no more than one URL from each queue is downloaded at a time and that the crawler makes at most one request to each host computer at a time. The FIFO queues in the Internet Archive web crawler have a one-to-one correspondence with the number of web hosts on the Internet; therefore, this approach requires a staggering number of queues, easily several million. However, this approach only processes 64 queues at a time; thus, not only are millions of queues sitting idle, but this process also puts a prolonged load on a small fraction of the Internet's web hosts.

The Scooter web crawler used by AltaVista uses a different approach. Scooter keeps a first list of URL's of web pages to be downloaded, and a second list of host computers from which downloads are in progress. Newly discovered URL's are added to the end of the first list. To locate a new URL to download, Scooter compares items in the first list with the second list until it finds a URL whose host computer is not in the second list. Scooter then removes that URL from the first list, updates the second list, and downloads the corresponding document. One of the disadvantages of this approach is the time wasted scanning through the list of URL's each time a thread in the crawler is ready to perform a download.

The Scooter web crawler also implements a policy called "politeness." In particular, it maintains an in-memory table mapping all known web servers to a next download time when they may be contacted again. This in-memory table can be very large, since the web crawler can have entries for hundreds of thousands or even millions of known web servers. The next download time value assigned to each web server by the Scooter web crawler is based on the download time of a previous document from the same web server. In particular, the time value assigned is the time at which the last download from the web server ended plus a constant factor C times the duration of that last download. The constant factor is user configurable. If a value of say, one hundred is used, this strategy guarantees that Scooter accounts for at most one percent of any given web server's load.

While scanning through the first list (see above discussion of the Scooter web crawler), Scooter not only skips over items in the first list that are in the second list, Scooter also skips over items in the first list whose associated web server has an assigned next download time value that is later than the current time. In this way, Scooter avoids sending download requests to any web server until the web server has been free of requests from Scooter for at least as long as C (the constant factor discussed above) times the duration of Scooter's last download from that web server.

The present invention provides more efficient web page downloading methods that avoid certain of the disadvantages and inefficiencies in the prior art methods, while preserving a politeness policy similar to the one implemented by the Scooter web server.

SUMMARY OF THE INVENTION

A web crawler downloads data sets from among a plurality of host computers. The web crawler enqueues data set addresses in a set of queues, with all data set addresses sharing a respective common host address being stored in a respective common one of the queues. Each non-empty queue is assigned a next download time. Multiple threads substantially concurrently process the data set addresses in the queues. The number of queues is at least as great as the number of threads, and the threads are dynamically assigned to the queues. In particular, each thread selects a queue not being serviced by any of the other threads. The queue is selected in accordance with the next download times assigned to the queues. The data set corresponding to the data set address at the head of the selected queue is downloaded and processed, and the data set address is dequeued from the selected queue. When the selected queue is not empty after the dequeuing step, it is assigning an updated download time. Then the thread deselects the selected queue, and the process of selecting a queue and processing a data set repeats.

The next download time assigned to each queue is preferably a function of the length of time it took to download a previous document whose address was stored in the queue. For instance, the next download time may be set equal to the current time plus a scaling constant multiplied by the download time of the previous document downloaded from that queue.

The queue selected by each thread is preferably a queue that has been assigned a next download time that is no later than the assigned next download time of all other eligible queues not selected by any of the other threads. All queues not currently being serviced by a thread are represented by entries in an ordered set, such as a heap or balanced tree. When a queue is selected by a thread, it is removed from the ordered set, and when a thread is finished processing an address from the selected queue, the queue is returned to the ordered set.

While a thread dequeues URL's from its assigned queue, it also enqueues any URL's discovered during the process of processing downloaded documents. When a thread discovers a new URL (i.e., in a document it has downloaded from a web site), a numerical function is performed to determine the queue in which to enqueue the new URL. Each queue may contain URL's referring to documents stored on different host computers; however, URL's referring to documents stored on the same host computer are always enqueued into the same queue. In this way, when all the threads are dequeuing in parallel from each respectively assigned queue, no more than one request to one host computer is made at the same time.

In a second exemplary embodiment, each queue is also dynamically assigned to a single host computer, so that URL's having the same host component are enqueued into the same underlying queue, and all URL's in any particular one of the underlying queues are all for the same host. When a new URL is discovered, the new URL is generally first enqueued into a main FIFO queue, and is later enqueued into one of the underlying queues based on host assignments to the queues. However, if the main queue is empty, the new URL may be directly enqueued into one of the underlying queues. Whenever a queue becomes empty, a new host can be dynamically assigned to it. For example, when a queue becomes empty, the thread servicing the empty queue begins enqueuing URL's from the main queue into the underlying queues until the thread finds a URL whose corresponding host is not yet assigned to any queue. The empty queue is assigned to the host of the new URL and the new URL is enqueued into that queue in accordance with the new assignment.

BRIEF DESCRIPTION OF THE DRAWINGS

FIG. 7 illustrates a table used in the second exemplary embodiment.

DETAILED DESCRIPTION OF PREFERRED EMBODIMENTS

Figure 1:
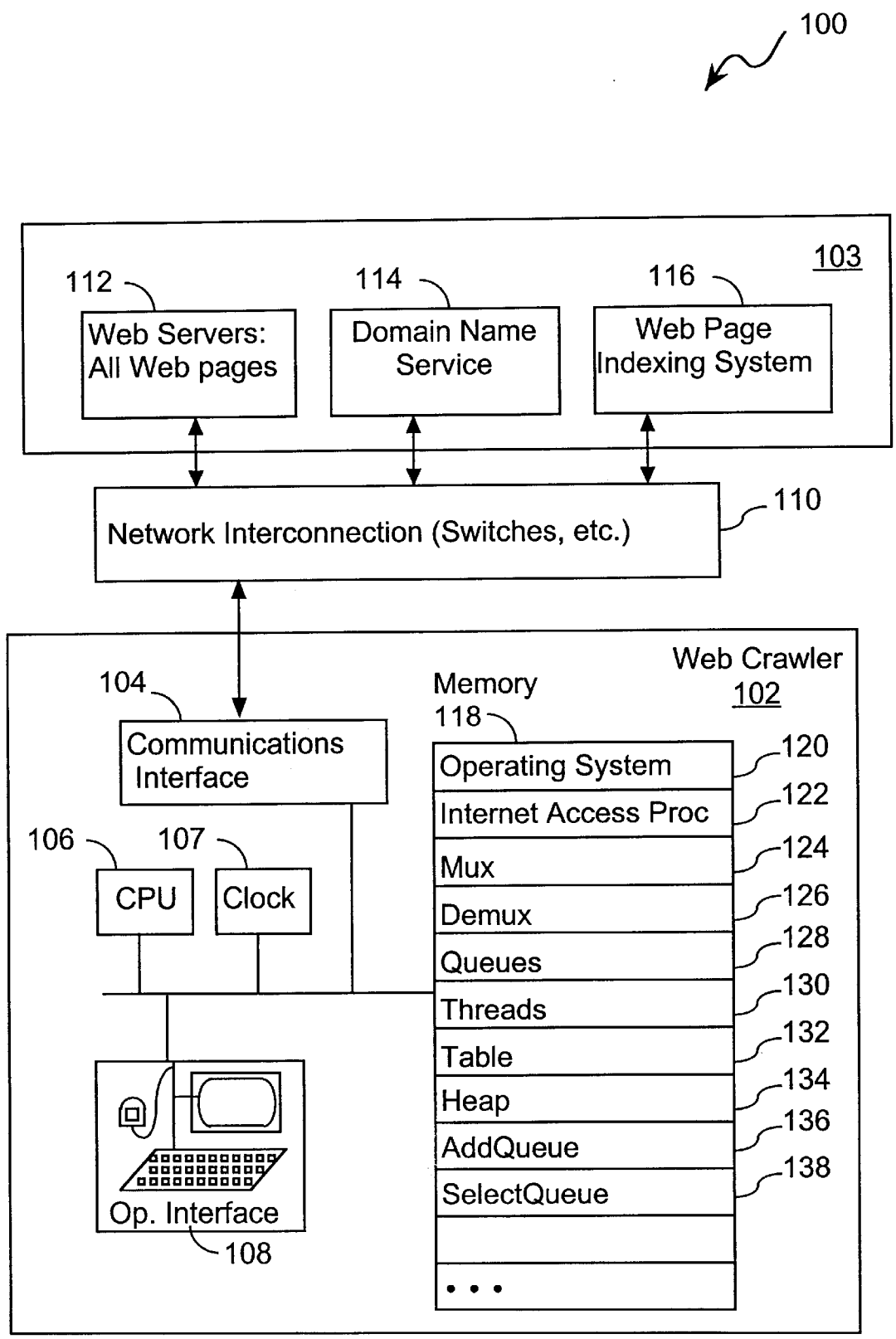
FIG. 1 is a block diagram of a distributed computer system illustrating an exemplary embodiment of the invention.

FIG. 1 shows an exemplary embodiment of a distributed computer system 100. The distributed computer system 100 includes a web crawler 102 connected to a network 103 through a network interconnection 110. The network 103 may be a global communication network, such as the Internet, or a private network, sometimes called an Intranet. Examples of network interconnections 110 includes switches, routers, etc.

The Internet network 103 includes web servers 112 and a service known as a domain name system (DNS) 114. It may also optionally include a web page indexing system 116. The web servers 112 store web pages. The domain name system 114 is a distributed database that provides the mapping between Internet protocol (IP) addresses and host names. The domain name system 114 is a distributed system because no single site on the Internet has the domain name mapping information for all the web servers in the network. Each site participating in the domain name system 114 maintains its own database of information and runs a server program that other systems across the Internet can query. The domain name system provides the protocol that allows clients and servers to communicate with each other. Any application may look up the IP address (or addresses) corresponding to a given host name or the host name corresponding to a given IP address in the domain name system 114. An application accesses the domain name system 114 through a resolver. The resolver contacts one or more name servers to perform a mapping of a host name to the corresponding IP address, or vice versa. A given host name may be associated with more than one IP address because an Internet host may have multiple interfaces, with each interface of the host having a unique IP address. Also, a host may be replicated on multiple computers, each having its own IP address, but providing access to the same information.

The web page indexing system 116 includes an index of words used on the world wide web and addresses of the web pages that use each word. Such indexing systems are maintained by various search engines, such as the AltaVista search engine. The domain name system 114 and the web page indexing system 116 may be accessed by the web crawler 102 in the process of downloading web pages from the world wide web.

The web crawler 102 includes a communications interface 104, one or more central processing units (CPU's) 106, a clock circuit 107 for keeping track of the current time, an operator interface 108 (which may be remotely located on another computer) and memory 118. In the preferred embodiment, the communications interface 104 is able to handle overlapping communication requests. The memory 118 includes:

- a multitasking operating system 120;
- an Internet access procedure 122 for fetching web pages as well as communicating with the domain name system 114;
- a multiplexer (mux) procedure 124 used by threads 130 for dequeuing URL's from the queues 128;
- a demultiplexer (demux) procedure 126 used by the threads for enqueuing URL's on the queues 128;
- queues 128 for storing addresses of web pages to be downloaded;
- threads 130 for downloading web pages from the servers 112, and processing the downloaded web pages;
- a host-to-queue assignment table 132 for recording dynamic assignments of host identifiers to the queues 128;
- a heap or other ordered set data structure 134 for storing information about queues waiting to be serviced by threads;
- an AddQueue procedure 136 for adding a queue to the ordered set data structure 134;
- a SelectQueue procedure 140 for selecting a queue in the ordered set that has an assigned next download time that is no later than the next download time of any other queue in the ordered set.

In the second exemplary embodiment, discussed below, the host-to-queue assignment table 132 is both used and updated by the demux and mux procedures 126, 124. In the first exemplary embodiment, the assignment table 132 is not used at all.

In both exemplary embodiments, the number of queues is at least the number of threads. Preferably, the number of queues is at least twice the number of threads, and more preferably the number of queues exceeds the number of threads by a factor of three to ten. The number of threads is generally determined by the computational resources of the web crawler, while the number of queues is determined by setting a queue-to-thread ratio parameter when the web crawler is configured. The larger the ratio of queues to threads, the less likely it will be that any thread will ever be idle.

Given a set of URL's, the web crawler 102 begins downloading documents by enqueuing the URL's into appropriate queues 128. Multiple threads 130 are used to dequeue URL's out of the queues 128, to download the corresponding documents or web pages from the world wide web and to extract any new URL's from the downloaded documents. Any new URL's are enqueued into the queues 128. This process repeats indefinitely or until a predetermined stop condition occurs, such as when all URL's in the queues have been processed and thus all the queues are empty. Multiple threads 130 are used to simultaneously enqueue and dequeue URL's from multiple queues 128. During the described process, the operating system 120 executes an Internet access procedure 122 to access the Internet through the communications interface 104.

The web crawler's threads substantially concurrently process the URL's in the queues. When the web crawler is implemented on a multiprocessor, some of the threads may run concurrently with each other, while others run substantially concurrently through the services of the multitasking operating system 120.

Figure 2:
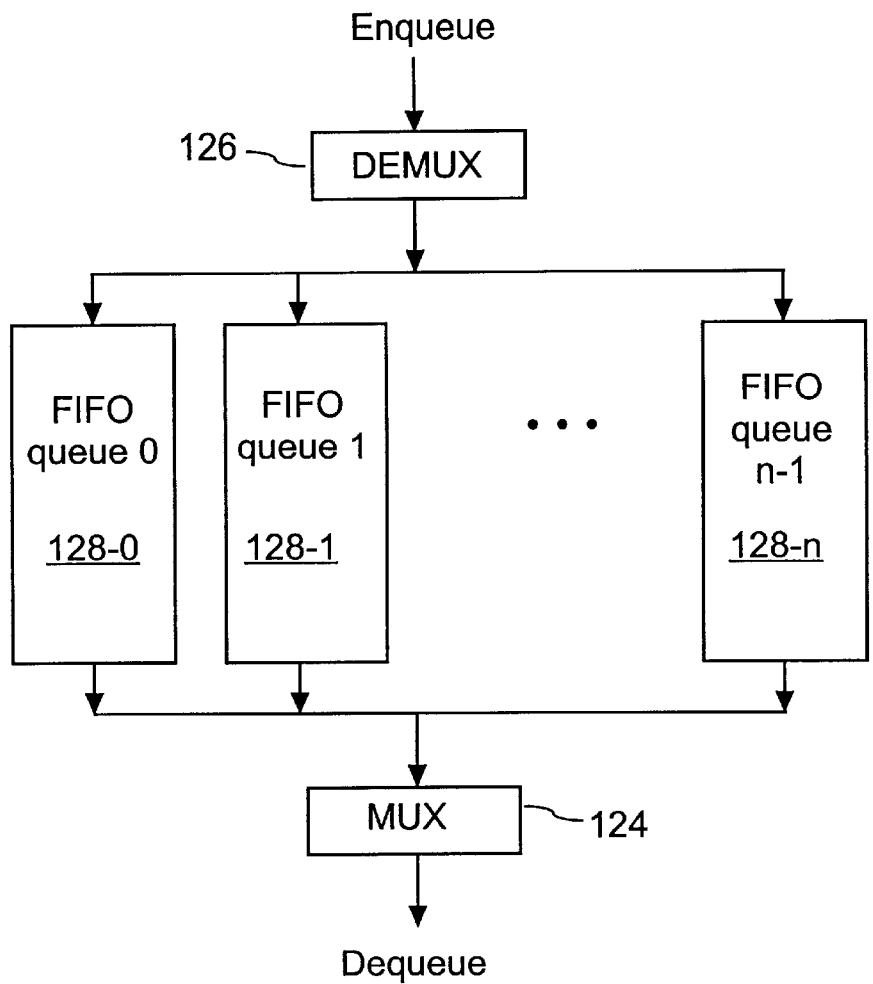
FIG. 2 is a block diagram illustrating an first exemplary embodiment of the invention.

FIG. 2 illustrates the relationships between a set of "n" first-in-first-out (FIFO) queues 128 and the demux and mux procedures 126, 124 in a first exemplary embodiment of the present invention. When a new URL is discovered, the new URL is passed to the demux 126. The demux 126 enqueues the new URL into an appropriate queue based on a predetermined policy. In particular, URL's having the same associated host component are enqueued into the same queue. When a thread 130 is ready to dequeue from one of the queues 128, the head URL in the queue assigned to that thread is dequeued from that queue by the mux 124 and is passed to the thread for processing.

Figure 3:
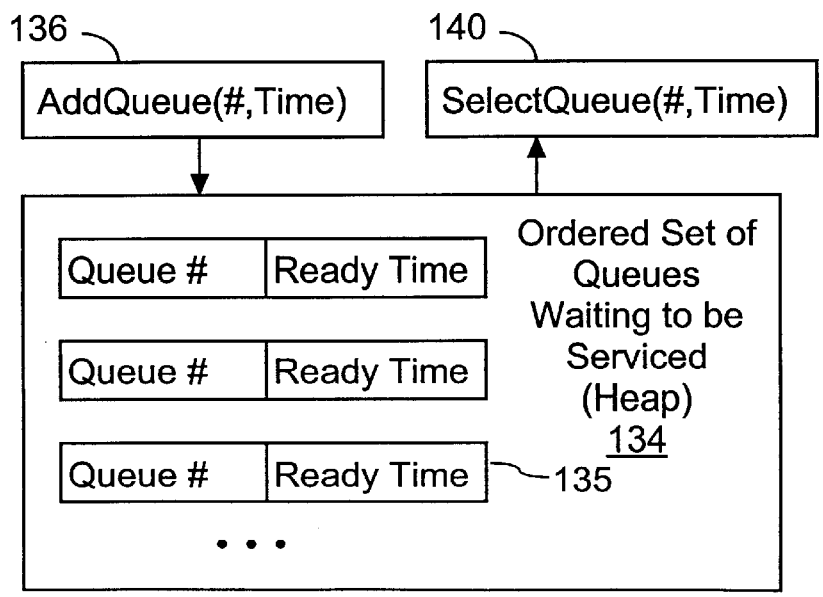
FIG. 3 is a block diagram of an ordered set data structure and procedures used to access the ordered set in a second exemplary embodiment of the invention.

FIG. 3 illustrates an "ordered set data structure" 134 for keeping track of the queues that are waiting to be serviced by threads. The data structure 134 stores an entry 135 for each queue that is waiting to be serviced. The entry 135 has a plurality of fields, including one for identifying the queue, and another for indicating the queue's assigned next download time. Although not shown, the data structure 134 has internal structure for ordering the entries 135 in accordance with the assigned next download times of the entries. A number of well known data structures can be used for this purpose, including a heap, a balanced tree, or even a simple linked list (suitable only if the number of queues being used is very small, e.g., less than a ten or twenty). The ordered set data structure is indirectly accessed by the enqueue and dequeue procedures through a set of interface procedures 136, 140. In particular, an AddQueue procedure 136 is used to add a queue to the ordered set. A SelectQueue procedure 140 is used to select and remove from the ordered set a queue whose assigned next download time is no later than any other queue in the ordered set. This procedure 140 blocks the calling thread until such a queue becomes available, either because enough time has elapsed, or because a queue was added to the set by another thread via the AddQueue procedure. If multiple queues have identical earliest assigned next download times, the SelectQueue procedure 140 selects any one of those queues, removes it from the ordered set, and passes it to the calling thread.

Enqueue and Dequeue Procedures

In the exemplary embodiments, and in most web crawlers, the web crawler begins its crawls with an initial set of root documents. The root documents are selected so that all documents of interest in the Intranet or Internet being crawled can be reached from the URL links in the initial set of root documents and in the subsequent documents accessed via those URL links. This initial set of root documents may be preloaded into the queues 128 of the web crawler's Frontier.

Figure 4:
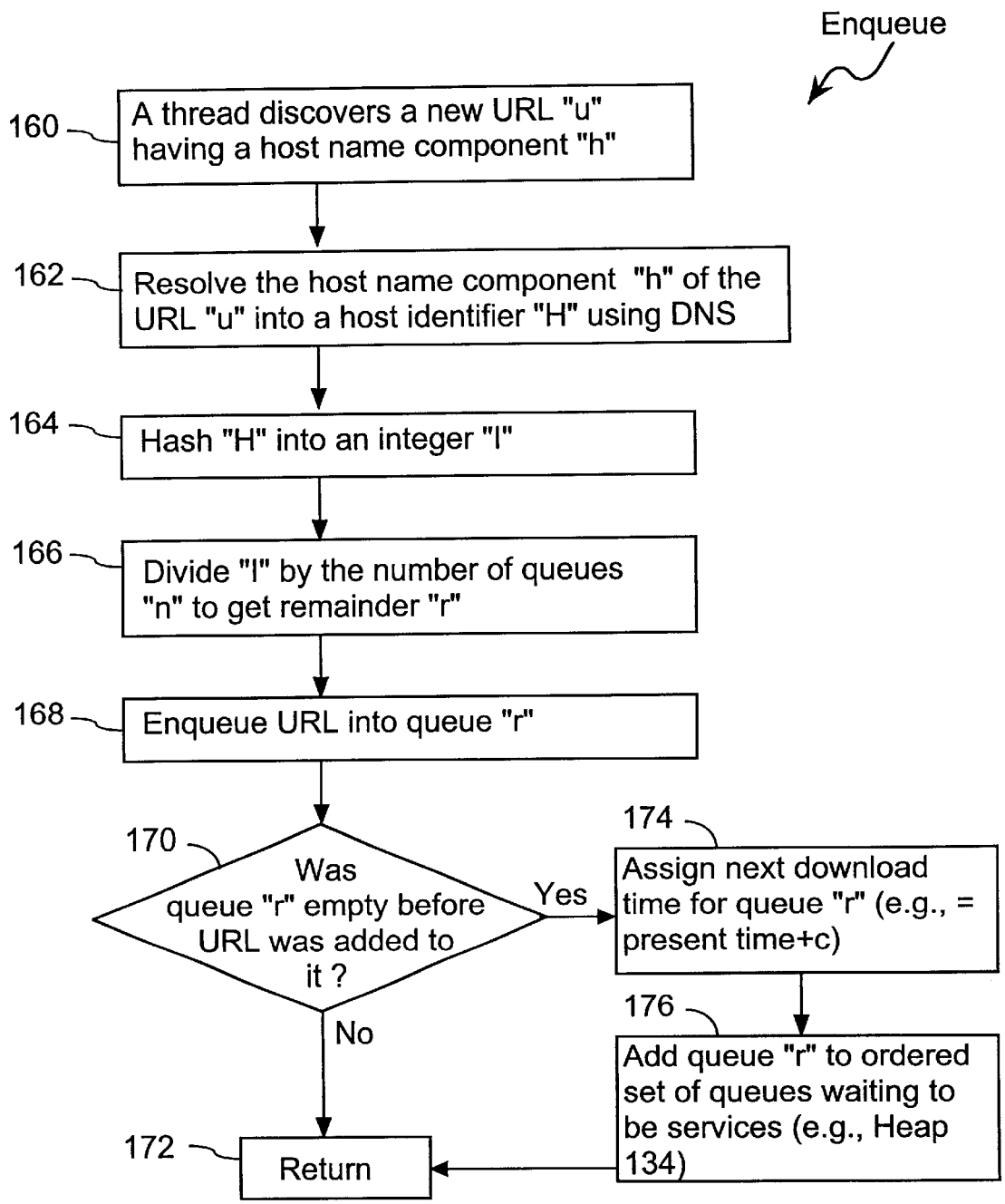
FIGS. 4 and 5 are flow charts depicting the first exemplary embodiment of the invention.

FIG. 4 is a flow chart illustrating the process, in the first exemplary embodiment of the present invention, for enqueuing URL's into a set of "n" queues using a set of "k" threads, where n is preferably larger than k. When a thread of the web crawler downloads a page or document, it inspects each URL in the downloaded page. The thread then determines if the web crawler should enqueue the page corresponding to the URL for downloading. For instance, the thread may query a database to determine whether that page has been visited during the current crawl or within a particular period of time, and then enqueues the URL only if the response to that inquiry is negative. The enqueue procedure described below is performed once for each URL that the thread has decided to enqueue.

In this exemplary process, queues are identified by numerical ID's. For example, when a thread with ID invokes the "dequeue" operation for a selected queue "i," the first item of the queue "i" is dequeued and returned.

The enqueue operation, performed by a thread executing the demux procedure 126, works as follows in the first exemplary embodiment. A thread discovers a new URL "u" having a host name component "h" during the course of downloading web pages (160). The host name component "h" of the URL "u" is resolved into a host identifier "H" using the domain name system 114 (162). The resolved host identifier is preferably a canonical name or a canonical IP address for the host. Step 162 maps all the host names associated with an Internet host to the same host identifier. Without step 162, the URL's associated with a single host might be assigned to multiple queues. That could cause the web crawler to submit multiple overlapping download requests to the host, which would violate one of the principle goals of this invention.

The host identifier "H" of the new URL "u" is mapped into a queue identifier "r" using a suitable numerical function. For example, in one preferred implementation, a fingerprinting function is used to hash the host identifier "H" into an integer "I" (164). The integer "I" (which is sometimes called the "fingerprint of H") is divided by the number of queues in the system, such as "n", to get a remainder "r" between 0 and n−1 (166). In other words, r is set equal to the fingerprint of H modulo n. Examples of other possible numerical functions that could be used to map the host identifier into a queue identifier are checksum or CRC functions, and simply hash functions based on bitwise operations.

Having selected queue "r," the new URL "u" is enqueued into queue "r" (168). If queue "r" already had at least one entry in it when the new URL "u" was enqueued on it (170-No), the procedure returns (172). Otherwise, if the queue "r" was empty (170-Yes), the thread executing the enqueue procedure assigns a next download time to the queue (174). For instance, the assigned next download time may be set equal to the current time plus a fixed increment. Alternately, a table may be used to store a download time value for each queue, in which case the assigned next download time is set equal to the current time plus the stored download time for the queue. When a table is used to store a download time value for each queue, that value is updated, using a rolling average methodology, each time that a document is downloaded from an address stored in the queue. For instance, the download time for each document is measured, and then averaged with the previously stored average download time using a weighted average that weights the previous average value with a weight of $\alpha$ and weights the newly measured download time with a weight of $1-\alpha$.

Next, the thread servicing queue "r" adds queue "r" to the ordered set of queues waiting to be serviced (176), and then the enqueue procedure returns (172).

Figure 5:
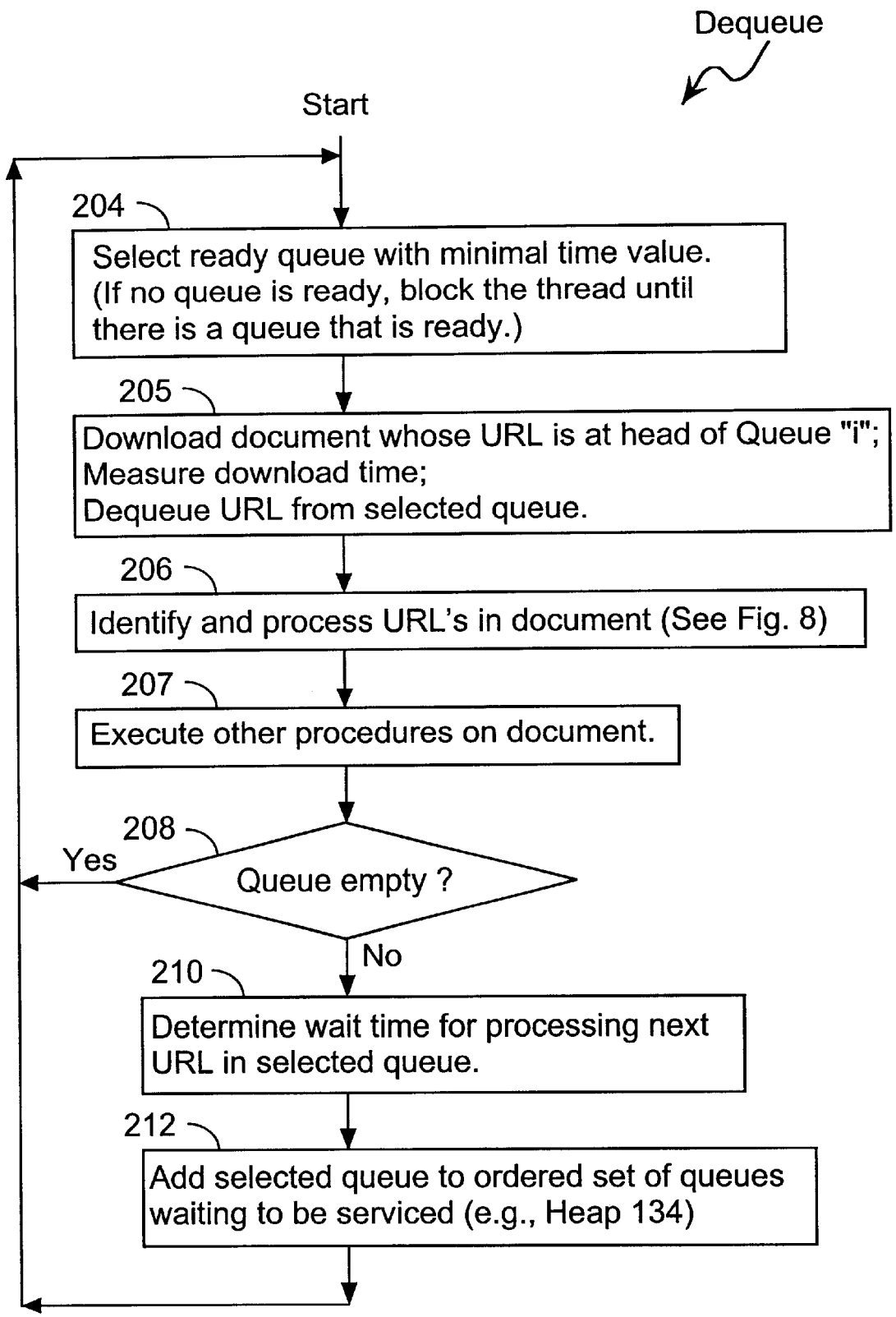

Referring to FIG. 5, each thread of the web crawler selects one of the queues in the ordered set that is waiting to be serviced, downloads the page or document corresponding to a URL in the selected queue, dequeues the URL from the selected thread, processes the page, and then repeats the process. This continues until the web crawl completes.

More specifically, the dequeue procedure, when executed by any of the web crawler threads, first selects a queue "i" having a minimal next download time value (204). This step is preferably accomplished by calling the SelectQueue procedure. If no queues are ready for processing, because their assigned next download times are all in the future, the thread executing the dequeue procedure blocks until there is a queue that is ready for processing.

As indicated above, if multiple queues have identical earliest assigned next download times, the SelectQueue procedure selects any one of those queues, removes it from the ordered set, and passes it to the calling thread. After selecting a queue, the thread processes the URL at the head of the selected queue by downloading the corresponding document, measuring the download time, and dequeuing the URL from the selected queue if the download is successful (205). The downloaded document is typically processed by the web crawler by identifying and processing the URL's in the document (206), as well as by executing other procedures on the downloaded document (207). In the preferred embodiment, the set of other procedures executed on the downloaded document is user configurable (e.g., by the person setting up the web crawler).

If the selected queue is empty (208-Yes) after the head URL is dequeued, the queue is not returned to the ordered set, and the thread resumes processing at step 204. If the queue is not empty, the thread determines a next download time for the queue (210), and then the queue is added to the ordered set of queues (212) by calling the AddQueue procedure, which stores in the ordered set an entry for the queue that includes the assigned next download time. Then the thread resumes processing at step 204.

In a preferred embodiment, the next download time assigned to the selected queue at step 210 is:

next download time=current time+$\beta$·(measured download time)

where $\beta$ is a predefined scaling constant. While $\beta$ may be set equal to 1, it can also be set equal to a larger number (e.g., 100) or smaller number (e.g., 0.5), depending on the politeness policy selected by the person configuring the web crawler.

Second Exemplary Embodiment

Figure 6:
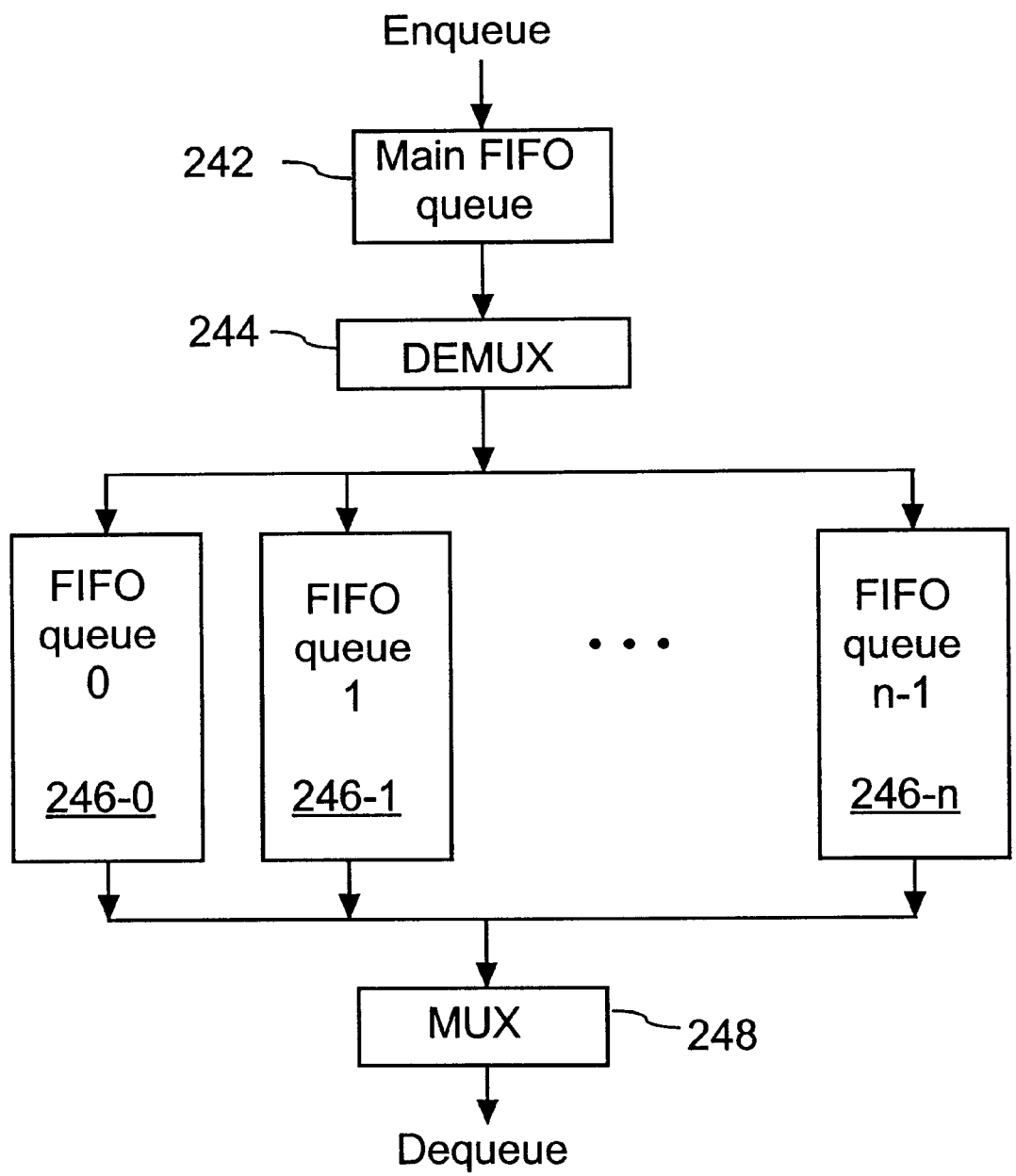
FIG. 6 is a block diagram illustrating the second exemplary embodiment of the invention.

FIG. 6 illustrates a second exemplary embodiment of the present invention. In this embodiment, there is a main FIFO queue 242, a demultiplexer procedure (demux) 244, "n" FIFO queues 246 and a multiplexer procedure (mux) 248. When a new URL is discovered, it is typically enqueued in the main FIFO queue 242. However, if the main FIFO queue 242 is empty, the new URL is not necessarily stored in the main FIFO queue 242; instead, it may be enqueued in one of the queues 246 by the demux 244. The demux 244 dynamically enqueues the new URL in an appropriate queue 246 according to a host-to-queue assignment table 132, based on the host identifier of the new URL. For example, each queue may be preassigned to a host and the new URL is enqueued into a queue based on the assignment so that each queue contains URL's having the same host name component. When a thread is ready to dequeue a URL from a queue 246, the head URL in a queue dynamically assigned to the thread passes through the mux 248 and is dequeued from the queue. The corresponding web page of the dequeued URL is downloaded and processed.

FIG. 7 illustrates an exemplary embodiment of the host-to-queue assignment table 132. The host-to-queue assignment table 132 is updated when a host identifier 260 is assigned to a queue (represented by a queue identifier 262) or when the association of a host identifier 260 with a queue is removed. Each queue 246 (FIG. 6) may be dynamically reassigned to a new host identifier whenever the queue becomes empty.

Figure 8:
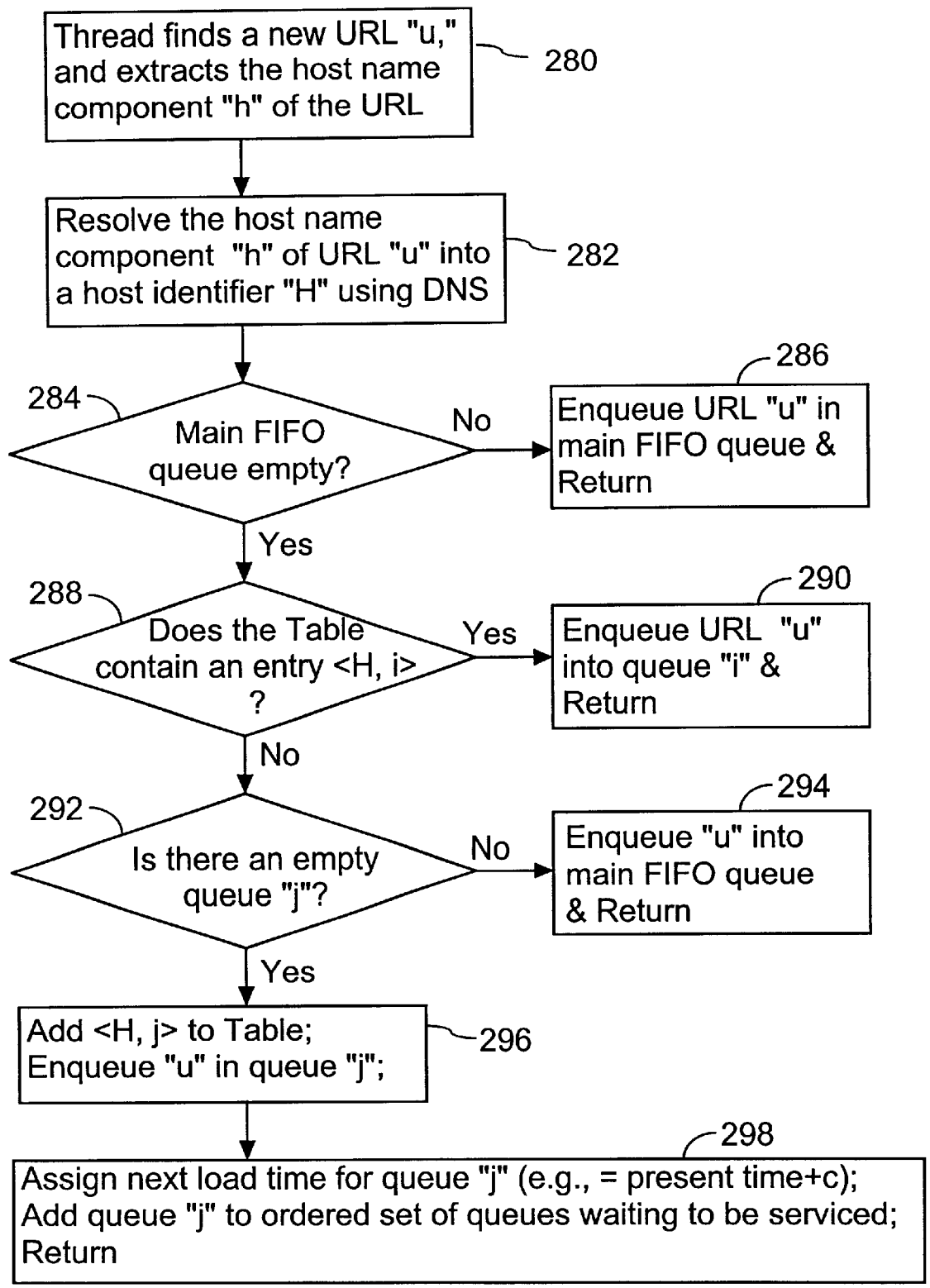
FIGS. 8, 9 and 10 are flow charts depicting the second exemplary embodiment of the invention.
Figure 9:
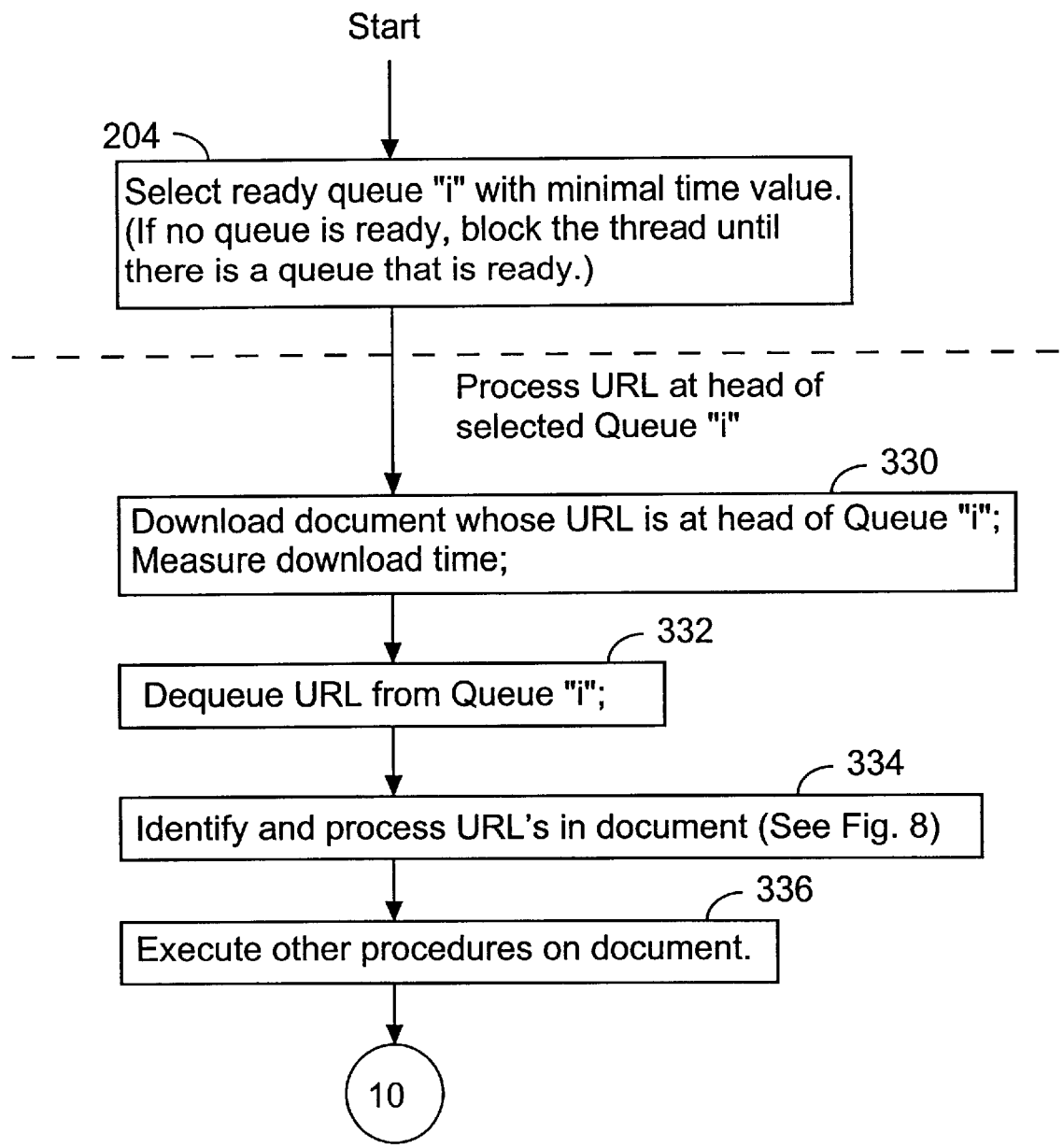
Figure 10:
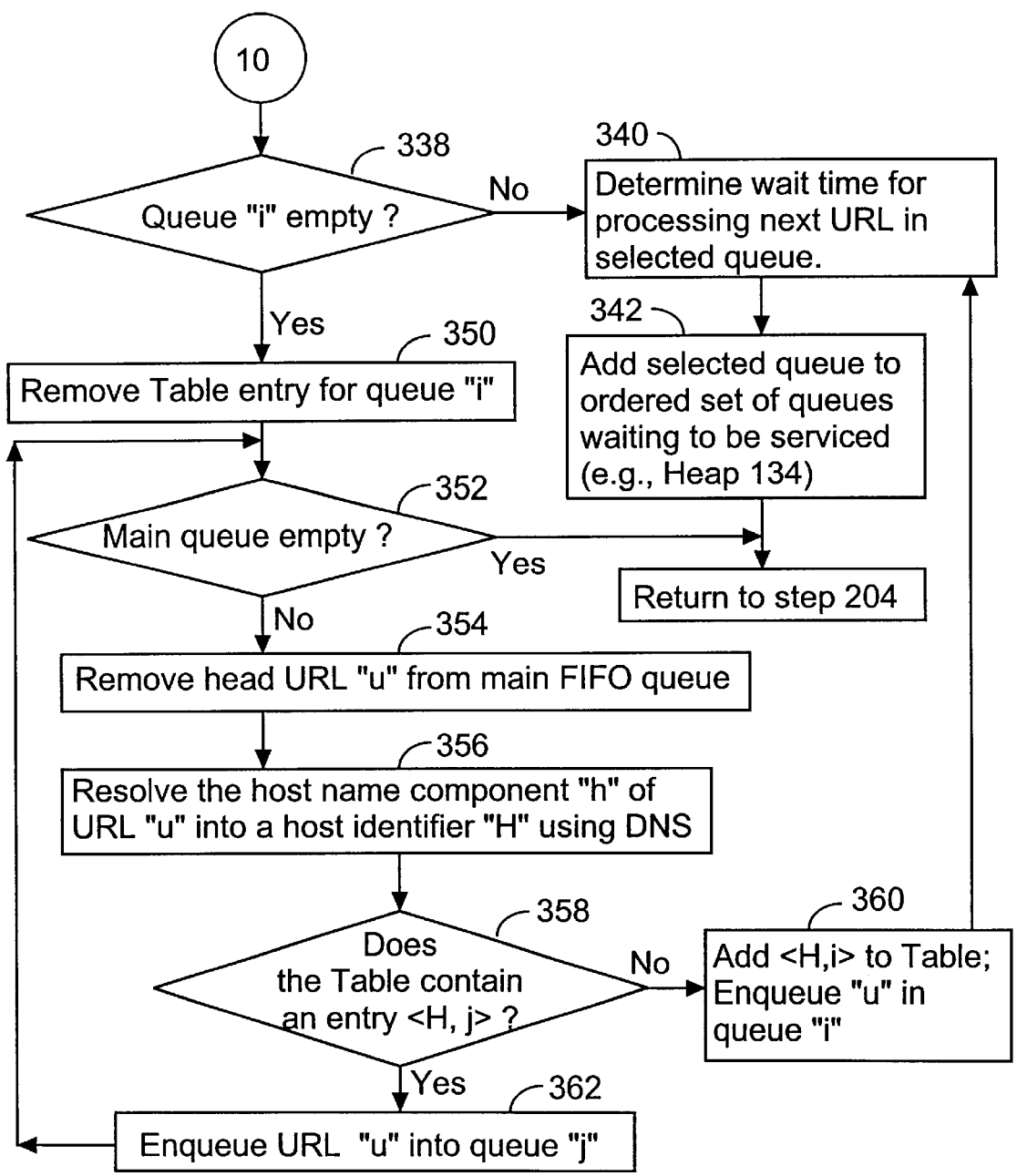

FIGS. 8, 9 and 10 are flow charts of the second exemplary embodiment of the present invention. In particular, the flow chart in FIG. 8 illustrates the enqueue operation, corresponding to the demux procedure 244 shown in FIG. 6, which is the procedure used by each of the threads to store new URL's discovered while processing downloaded web pages. In the following explanations, queues are identified by numerical ID's.

Referring to FIG. 8, while processing a downloaded web page, a thread will determine whether the URL in each link in the page is a known URL, which has already been enqueued and/or processed by the web crawler, or a new URL, which has not yet been enqueued or processed by the web crawler. When a thread discovers a new URL "u," it extracts the host name component "h" from the URL (280). The host name component "h" of the URL "u" is resolved into a host identifier "H" using the domain name system 114 (282). The thread then determines whether the main FIFO queue 402 is empty (284). If the main FIFO queue 402 is not empty, the URL "u" is enqueued into the main FIFO queue 402 (286) and then the enqueue procedure exits. The process for moving URL's from the main FIFO queue into the underlying queues is described later.

If the main FIFO queue 402 is empty (284-Yes), the thread searches the table 132 for an entry assigning "H" to any of the queues (288). If such an entry is found, the new URL "u" is enqueued into the queue "i" to which host address "H" is assigned, and the thread returns (290). If such an entry does not exist, the thread searches for an empty queue "j" (292). If there is no empty queue, the URL "u" is enqueued into the main FIFO queue 402 and the thread returns (294). If an empty queue "j" is found, "H" is assigned to queue "j", table 132 is updated with the new assignment, and the URL "u" is enqueued into the queue "j" (296). In addition, the queue "j" is assigned a next download time and is added to the ordered set of queues waiting to be serviced (298), and then the thread returns. Since the last time that the web crawler performed a download from the host H is unknown, the next download time assigned to the queue is arbitrarily selected, for instance by adding a small constant to the current time.

FIGS. 9 and 10 contain a flow chart of the procedure performed by each thread in the second exemplary embodiment to dequeue and process the URL's in the queues. This procedure corresponds to the mux procedure 248 shown in FIG. 6. As part of this procedure, the thread moves URL's from the main queue to the underlying queues whenever the queue selected by the thread becomes empty, because all the URL's in the queue have been processed and dequeued. The demux procedure shown in FIGS. 9 and 10 is performed continuously by each of the "n" threads of the web crawler. The enqueue procedure, discussed above and shown in FIG. 8, is performed while processing a downloaded web page (step 334 of FIG. 10). Step 204 of the demux procedure in this second exemplary embodiment is the same as step 204 of the demux procedure in the first exemplary embodiment, described above with reference to FIG. 5. After selecting a queue, the thread processes the thread at the head of the selected queue. In particular, the thread processes the URL at the head of the selected queue (330) by downloading the corresponding document, measuring the download time, and dequeuing the URL from the selected queue if the download is successful (332). The downloaded document is typically processed by the web crawler by identifying and processing the URL's in the document (334), as well as by executing other procedures on the downloaded document (336). In the preferred embodiment, the set of other procedures executed on the downloaded document is user configurable.

If the selected queue is not empty (338-No) after the head URL is dequeued, the thread determines a next download time for the queue (340), and then the queue is added to the ordered set of queues (342) by calling the AddQueue procedure, which stores in the ordered set an entry for the queue that includes the assigned next download time. Then the thread resumes processing at step 204 (FIG. 9).

However, if the selected queue "i" is empty (338-Yes), the queue is not immediately returned to the ordered set. Rather, the table entry for queue "i" is removed, on the basis that an empty queue is available for reassignment to a new host. If the main FIFO queue is empty (352-Yes), the thread then resumes processing at step 204. Otherwise (i.e., the main FIFO is not empty, 352-No), the thread removes the head URL "u" from the main FIFO queue (354), and resolves the host name "h" of the URL "u" into a host identifier "H" using the domain name system 114 (456). If there is an entry in the host-to-queue assignment table 132 (FIG. 7) such that "H" is the assigned host identifier for a queue "j" (358-Yes), the URL "u" is enqueued into the queue "j" (362) and the thread goes back to step 352 to process the next URL (if any) in the main FIFO. If there is not an entry in the table 132 that maps host identifier "H" to a queue "j" (358-No), "H" is assigned to queue "i" (360). In particular, the table 132 is updated with the new assignment and the URL "u" is enqueued into the queue "i" (360). The thread then executes steps 340 and 342 (described above) before resuming processing at step 204 (FIG. 9).

In the first exemplary embodiment, when crawling in a network with a relatively small number of host computers, such as in an Intranet, some queues may be empty while other queues may contain URL's for multiple server hosts. Thus, in the first embodiment, parallelism may not be efficiently maintained, since more threads will be idle. The second embodiment described makes better use of thread capacity, on average, by dynamically reassigning queues to whichever hosts have pages that need processing. In both exemplary embodiments, the same politeness policies are enforced, whereby the web crawler not only does not submit overlapping download requests to any host, but also waits between document downloads from each host for a period of time. The wait time between downloads from a particular host may be a constant value, or may be proportional to the download time of one or more previous documents downloaded from the host.

The foregoing examples illustrate certain exemplary embodiments of the invention from which other embodiments, variations and modifications will be apparent to those skilled in the art. The invention should therefore not be limited to the particular exemplary embodiments discussed herein, but rather defined by the claims appended hereto.

What is claimed is:

1. A method of downloading data sets from among a plurality of host computers, comprising:

(a) obtaining at least one referring data set that includes addresses of one or more referred data sets; each referred data set address including a host address;

(b) enqueuing the referred data set addresses in a plurality of queues, including enqueuing those of the referred data set addresses sharing a respective common host address into a respective common one of the queues;

(c) assigning a next download time to each of the queues that has enqueued therein at least one referred data set address;

(d) substantially concurrently operating a plurality of threads, wherein the number of queues is at least as great as the number of threads;

(e) while operating each thread, repeatedly performing steps of:

(e1) selecting one of the queues not selected by any of the other threads, in accordance with the next download times assigned to the queues not selected by any of the other threads;

(e2) downloading a referred data set corresponding to a referred data set address in the selected queue, processing the downloaded referred data set, dequeuing the referred data set address from the selected queue;

(e3) when the selected queue is not empty after the dequeuing step, assigning an updated next download time to the selected queue; and (e4) deselecting the selected queue;

wherein the enqueuing of referred data set addresses sharing a respective common host address to a respective common one of the queues in step (b) ensures that the downloading in step (e2) by the plurality of threads does not simultaneously download more than one referred data set from any of the host computers.

2. The method of claim 1, wherein the queue selected in step e1 has an assigned next download time that is no later than the assigned next download time of all other queues not selected by any of the other threads.

3. The method of claim 1, further comprising iteratively downloading additional data sets by:

(i) using at least one of the downloaded referred data sets of step e2 as a new referring data set for step a; and (ii) repeating steps a through e.

4. The method of claim 1, wherein the data sets include web pages and the data set addresses include uniform resource locators.

5. The method of claim 1, wherein each of the queues is a first-in-first-out queue.

6. The method of claim 1, wherein the queues not selected by any of the other threads are stored as an ordered set, ordered with respect to the next download times assigned to the queues in the ordered set;

said stepe 1 includes removing the selected queue from the ordered set; and said step e4 includes returning the selected queue to the ordered set.

7. The method of claim 6, including delaying the queue selection step when the next download times assigned to all the queues in the ordered set are later than a current time.

8. The method of claim 1, including delaying the queue selection step when the next download times assigned to all the queues in the ordered set are later than a current time.

9. The method of claim 1, wherein step e2 includes determining a download time for the downloading of the referred data set;

the updated next download time assigned by step e3 to the selected queue is a function of the determined download time.

10. The method of claim 9, wherein the updated next download time assigned by step e3 is equal to a current time plus a scaling constant multiplied by the determined download time.

11. The method of claim 1, wherein said step (b) of enqueuing the referred data set addresses includes:

(b1) calculating a fingerprint for each referred data set address based on at least part of the host address included in the referred data set address; and (b2) allocating the address to one of the queues based on the fingerprint.

12. The method of claim 11, wherein:

(i) the plurality of queues comprises N queues, each of the queues having an associated numerical identifier; and (ii) step (b2) includes assigning each referred data set address to the queue having a numerical identifier equal to the referred data set address fingerprint modulo N.

13. The method of claim 1, where step (b) includes:

(b1) enqueuing the referred data set addresses into a main queue;

(b2) assigning a host to each of said plurality of queues;

(b3) enqueuing said referred data set addresses from said main queue into said queues according to said assignment; and (b4) assigning a new host any one of said plurality of queues when said one queue becomes empty.

14. The method of claim 1, wherein there are at least twice as many queues as threads.

15. A computer program product for use in conjunction with a computer system, the computer program product comprising a computer readable storage medium and a computer program mechanism embedded therein, the computer program mechanism comprising:

an enqueuing module that, when executed by the computer system, obtains at least one referring data set that includes addresses of one or more referred data sets, each referred data set address including a host address corresponding to a host computer, and enqueues the referred data set addresses in a plurality of queues, including enqueuing those of the referred data set addresses sharing a respective common host address into a respective common one of the queues;

a thread module for launching execution of a plurality of threads, wherein there are at least as many queues as threads;

a dequeuing module that is substantially concurrently executed by each of the plurality of threads so as to sequentially processes the referred data set addresses in the queues; the dequeuing module, when executed by a respective one of the threads, repeatedly performs the functions of (a1) selecting one of the queues not selected by any of the other threads;

(a2) downloading a referred data set corresponding to a referred data set address in the selected queue, processing the downloaded referred data set, dequeuing the referred data set address from the selected queue;

(a3) when the selected queue is not empty after the dequeuing step, assigning an updated next download time to the selected queue; and (a4) deselecting the selected queue;

wherein the dequeuing module selects a queue in accordance with the next download times assigned to the queues not selected by any of the other threads;

wherein the enqueuing module enqueues all referred data set addresses sharing a respective common host address to a respective common one of the queues, and the dequeuing module downloads at most one referred data set from any one host computer at any one time.

16. The computer program product of claim 15, wherein the queue selected by the enqueuing module has an assigned next download time that is no later than the assigned next download time of all other queues not selected by any of the other threads.

17. The computer program product of claim 15, wherein said enqueuing module is configured to use at least one of the downloaded referred data sets as a new referring data set.

18. The computer program product of claim 15, wherein the data sets include web pages and the data set addresses include uniform resource locators.

19. The computer program product of claim 15, wherein each of the queues is a first-in-first-out queue.

20. The computer program product of claim 15, wherein the dequeuing module instructions for storing representations of the queues not selected by any of the threads in an ordered set, ordered with respect to the next download times assigned to the queues in the ordered set, removes the selected queue from the ordered set prior to downloading a referred data set corresponding to a referred data set address in the selected queue, and returns the select queue to the ordered set after dequeuing the referred data set address from the selected queue.

21. The computer program product of claim 20, wherein the dequeuing module includes instructions for delaying selection of a queue when the next download times assigned to all the queues in the ordered set are later than a current time.

22. The computer program product of claim 15, wherein the dequeuing module includes instructions for delaying selection of a queue when the next download times assigned to all the queues in the ordered set are later than a current time.

23. The computer program product of claim 15, wherein
the dequeuing module includes instructions for determining a download time for the downloading of the referred data set; and
the updated next download time assigned by the dequeuing module to the selected queue is a function of the determined download time.

24. The computer program product of claim 23, wherein the updated next download time assigned by the dequeuing module is equal to a current time plus a scaling constant multiplied by the determined download time.

25. The computer program product of claim 15, wherein said enqueuing module includes instructions for calculating a fingerprint for each referred data set address based on at least part of the host address included in the referred data set address, and allocating the address to one of the queues based on the fingerprint.

26. The computer program product of claim 15, wherein said enqueuing module addresses includes instructions for calculating a fingerprint for each referred data set address based on at least part of the host address included in the referred data set address, and instructions for allocating the address to one of the queues based on the fingerprint.

27. The computer program product of claim 26, wherein: the plurality of queues comprises N queues, each of the queues having an associated numerical identifier; and the instructions for allocating assign each referred data set address to the queue having a numerical identifier equal to the referred data set address fingerprint modulo N.

28. The computer program product of claim 15, wherein there are at least twice as many queues as threads.

29. A web crawler for downloading data sets from among a plurality of host computers, comprising:

a plurality of threads of execution;
an enqueuing module, executed by each of the plurality of threads, that obtains at least one referring data set that includes addresses of one or more referred data sets, each referred data set address including a host address corresponding to a host computer, and enqueues the referred data set addresses in a plurality of queues, including enqueuing those of the referred data set addresses sharing a respective common host address into a respective common one of the queues; and
a dequeuing module that is substantially concurrently executed by each of the plurality of threads so as to sequentially processes the referred data set addresses in the queues; the dequeuing module, when executed by a respective one of the threads, repeatedly performs the functions of
  (a1) selecting one of the queues not selected by any of the other threads;
  (a2) downloading a referred data set corresponding to a referred data set address in the selected queue, processing the downloaded referred data set, dequeuing the referred data set address from the selected queue;
  (a3) when the selected queue is not empty after the dequeuing step, assigning an updated download time to the selected queue; and
  (a4) deselecting the selected queue;
wherein
  the dequeuing module selects a queue in accordance with the next download times assigned to the queues not selected by any of the other threads;
wherein the enqueuing module enqueues all referred data set addresses sharing a respective common host address to a respective common one of the queues, and the dequeuing module downloads at most one referred data set from any one host computer at any one time.

30. The web crawler of claim 29, wherein the queue selected by the enqueuing module has an assigned next download time that is no later than the assigned next download time of all other queues not selected by any of the other threads.

31. The web crawler of claim 29, wherein said enqueuing module is configured to use at least one of the downloaded referred data sets as a new referring data set.

32. The web crawler of claim 29, wherein the data sets include web pages and the data set addresses include uniform resource locators.

33. The web crawler of claim 29, wherein each of the queues is a first-in-first-out queue.

34. The web crawler of claim 29, wherein the dequeuing module instructions for storing representations of the queues not selected by any of the threads in an ordered set, ordered with respect to the next download times assigned to the queues in the ordered set, removes the selected queue from the ordered set prior to downloading a referred data set corresponding to a referred data set address in the selected queue, and returns the select queue to the ordered set after dequeuing the referred data set address from the selected queue.

35. The web crawler of claim 34, wherein the dequeuing module includes instructions for delaying selection of a queue when the next download times assigned to all the queues in the ordered set are later than a current time.

36. The web crawler of claim 29, wherein the dequeuing module includes instructions for delaying selection of a queue when the next download times assigned to all the queues in the ordered set are later than a current time.

37. The web crawler of claim 29, wherein the dequeuing module includes instructions for determining a download time for the downloading of the referred data set; and the updated next download time assigned by the dequeuing module to the selected queue is a function of the determined download time.

38. The web crawler of claim 37, wherein the updated next download time assigned by dequeuing module is equal to a current time plus a scaling constant multiplied by the determined download time.

39. The web crawler of claim 29, wherein said enqueuing module includes instructions for calculating a fingerprint for each referred data set address based on at least part of the host address included in the referred data set address, and allocating the address to one of the queues based on the fingerprint.

40. The web crawler of claim 29, wherein said enqueuing module addresses includes instructions for calculating a fingerprint for each referred data set address based on at least part of the host address included in the referred data set address, and instructions for allocating the address to one of the queues based on the fingerprint.

41. The web crawler of claim 40, wherein: the plurality of queues comprises N queues, each of the queues having an associated numerical identifier; and the instructions for allocating assign each referred data set address to the queue having a numerical identifier equal to the referred data set address fingerprint modulo N.

42. The web crawler of claim 29, wherein there are at least twice as many queues as threads.

* * * * *